Nov. 22, 1960  F. DUSTAN  2,960,978
MACHINE FOR SAWING CRYSTALS AND OTHER HARD MATERIALS
Filed April 24, 1959  3 Sheets-Sheet 1
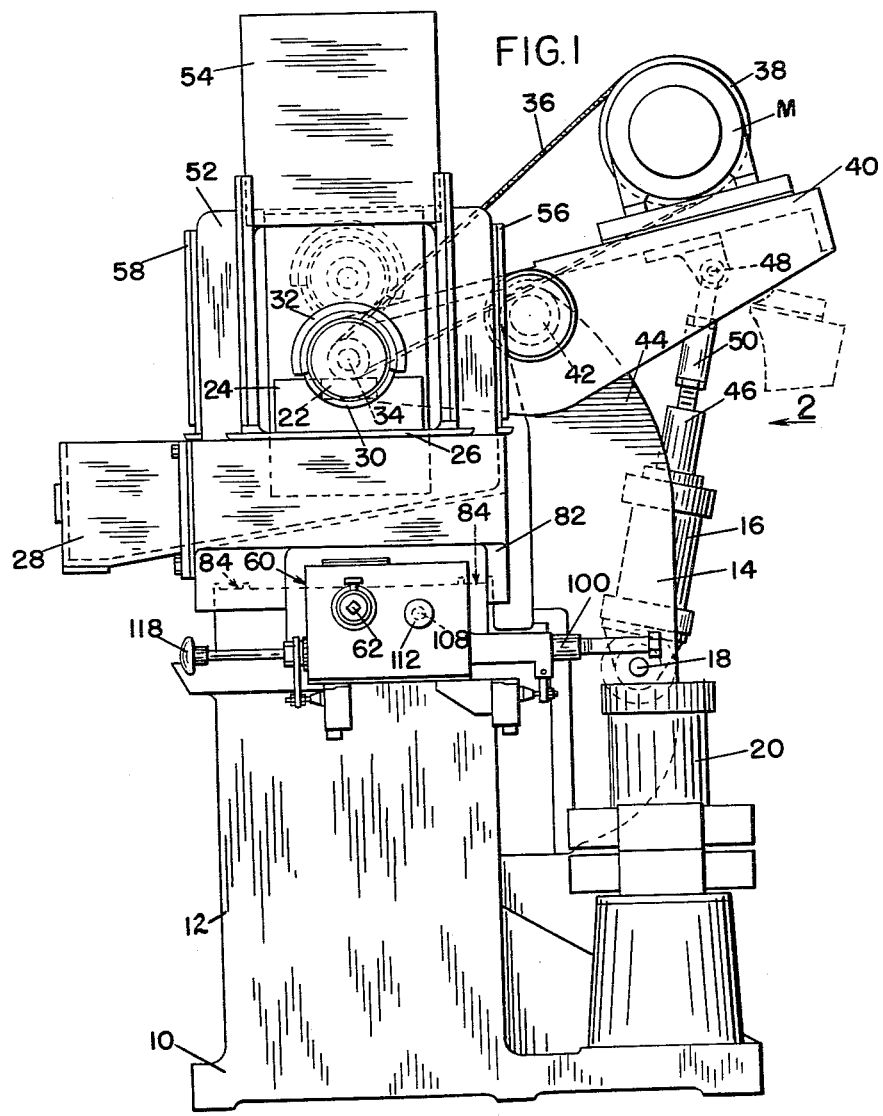
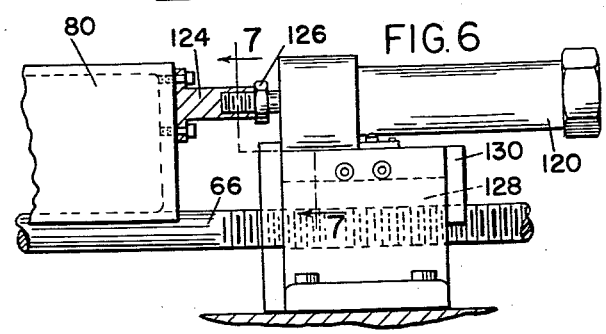
INVENTOR
FRANK DUSTAN
by Charles R. Fay
ATTORNEY Nov. 22, 1960 F. DUSTAN 2,960,978
MACHINE FOR SAWING CRYSTALS AND OTHER HARD MATERIALS
Filed April 24, 1959 3 Sheets-Sheet 2
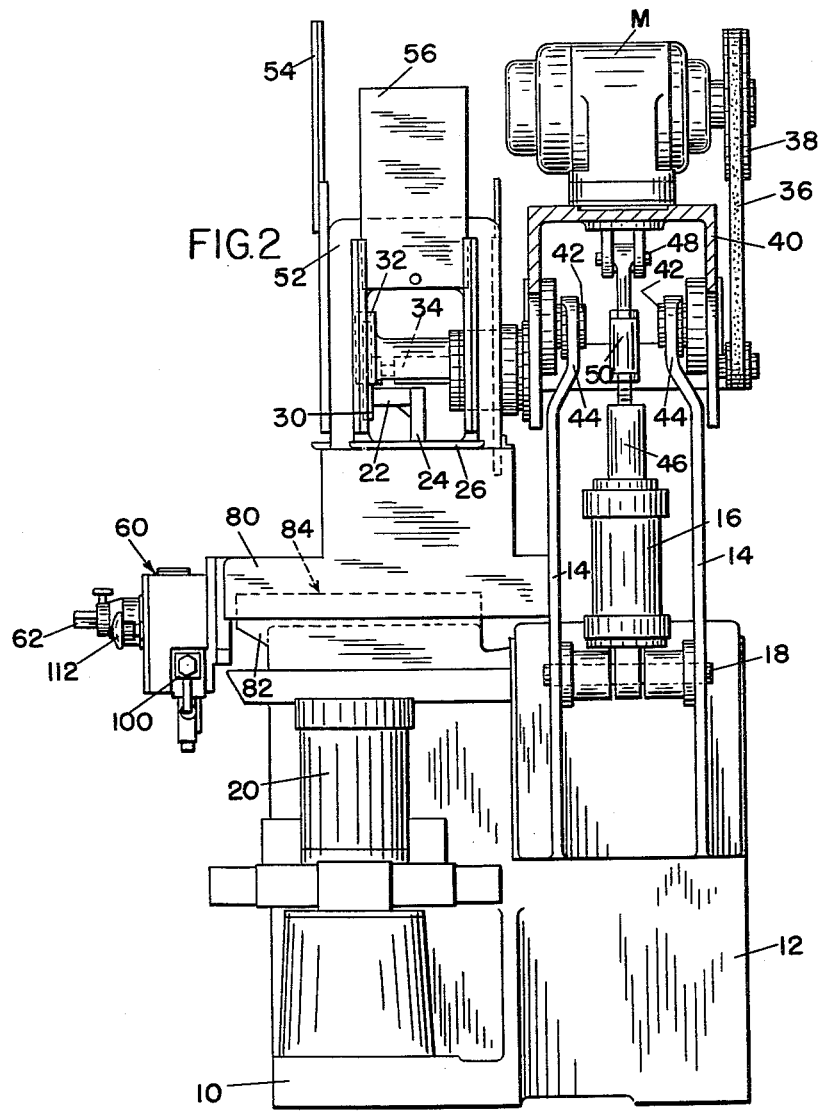
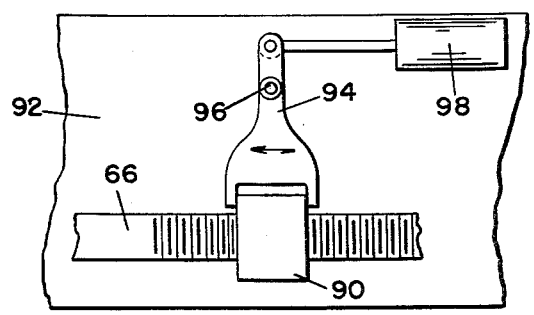
INVENTOR
FRANK DUSTAN
by Charles R. Fay
ATTORNEY Nov. 22, 1960 F. DUSTAN 2,960,978
MACHINE FOR SAWING CRYSTALS AND OTHER HARD MATERIALS
Filed April 24, 1959 3 Sheets-Sheet 3
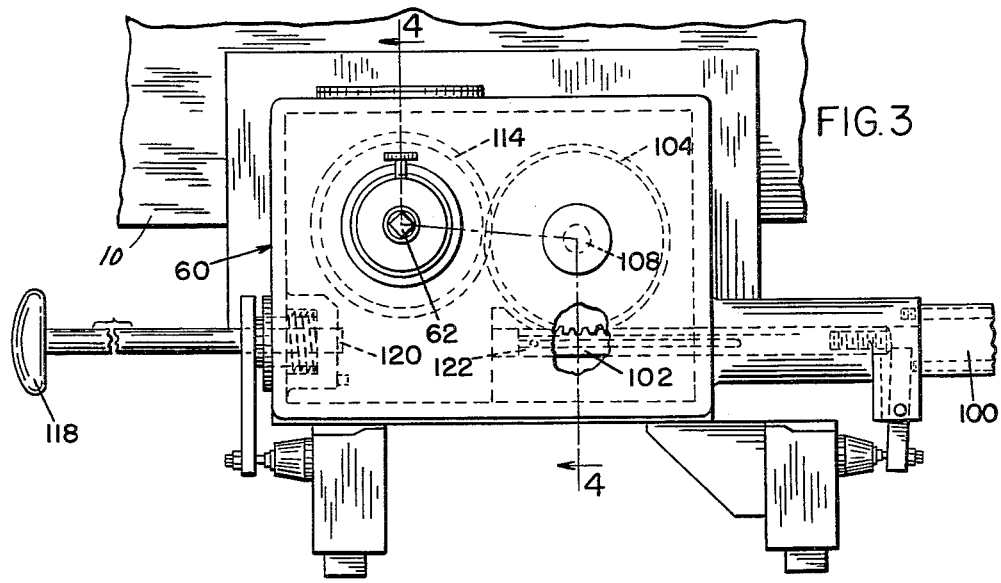
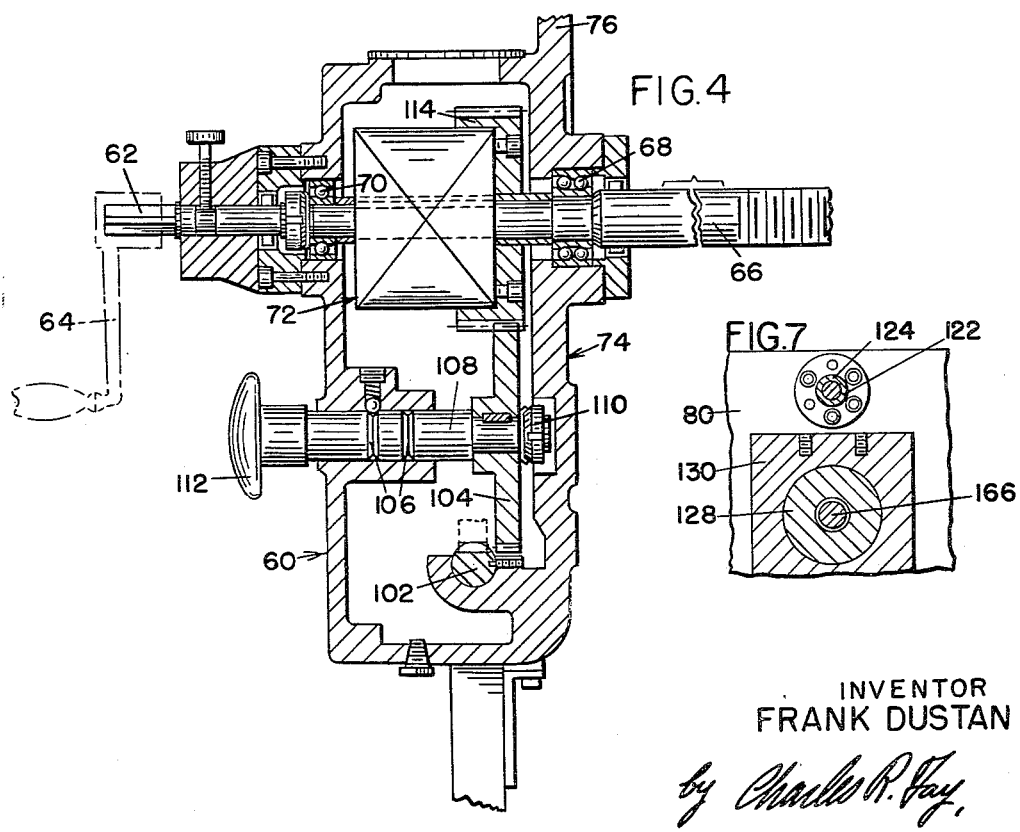
INVENTOR
FRANK DUSTAN
by Charles R. Fay,
ATTORNEY United States Patent Office 2,960,978
Patented Nov. 22, 1960

2,960,978
MACHINE FOR SAWING CRYSTALS AND OTHER HARD MATERIALS

Frank Dustan, Fitchburg, Mass., assignor to Fitchburg Engineering Corporation, Fitchburg, Mass., a corporation of Massachusetts Filed Apr. 24, 1959, Ser. No. 808,803

13 Claims. (Cl. 125—13)

This invention relates to a new and improved apparatus for severing thin wafers from crystals, particularly semi-conductor crystals, ferrites, quartz and other hard materials; and the principal object of the invention resides in the provision of a machine which is capable of sawing such wafers with extreme accuracy down to a few thousandths of an inch of thickness; and in which said apparatus is rugged, long-lasting, easily and quickly adjustable as to thickness of cut so that wafers may be sawed off to required thicknesses; said apparatus including means providing for a swing saw type of device which quickly and accurately cuts the hard workpiece by means of a diamond-edge disc cutter or the like, said cutter being arranged to be rotated at relatively high speeds and cutting the wafers smoothly and evenly.

Further objects of the invention reside in the provision of an apparatus of the class described in which the work is held in fixed position and the saw blade is operated on a pivot in the nature of a swing saw to cut down through the work rapidly and accurately and to operate continuously for long periods of time without attention on the part of the operator; and the provision of an apparatus as described including means for backing off the work after each cut, so that when the swing saw returns to its original starting position, ready for the next cut, there is no possibility of scarring the cut surface of the crystal or other workpiece body.

Further objects of the invention include the provision of an apparatus for severing wafers from hard materials such as crystals as above described and including new and improved work-advancing means intermittently operated after each stroke of the saw mount in order to adjustably advance the work to the desired degree for the next cut, and including accurate adjusting means therefor; and the provision of an apparatus as above described in combination with means for retracting the entire work-mounting apparatus from the plane of the saw blade after each cut, the work-advancing means then operating to project the workpiece beyond the operative plane of the saw blade in order to position the same accurately for the next cut.

The invention further relates to arrangements and combinations of parts which will be hereinafter described and more particularly set forth in the appended claims.

Reference is to be had to the accompanying drawings, in which

Fig. 1 is a view in front elevation, illustrating the apparatus;

Fig. 2 is a view in side elevation thereof, looking in the direction of arrow 2 in Fig. 1;

Fig. 3 is a view on an enlarged scale illustrating the cross feed;

Fig. 4 is a section on line 4—4 of Fig. 3;

Fig. 5 is a plan view illustrating the apparatus for retracting the work between each stroke of the saw blade;

Fig. 6 is a view in elevation of a modification of the apparatus of Fig. 5; and

Fig. 7 is a section on line 7—7 of Fig. 6.

In carrying out the present invention, the apparatus in general may be mounted on any kind of base 10 which is suitable for the purpose, and this base may comprise in general a work-supporting portion 12 and another portion as indicated at 14 which supports a hydraulic cylinder or the like 16. This cylinder is mounted on a pivot 18 on the portion 14. A pump for the hydraulic apparatus may be conveniently mounted as at 20 or in any way desired.

The workpiece to be cut is indicated at 22 and may be operatively mounted by being cemented to a work-holding plate 24 on a bed, platen or the like as at 26. A tank 28 receives the coolant which is directed in any way desired to the saw blade indicated at 30, this saw blade being provided with a guard 32 and being mounted on a shaft 34 driven by a belt 36 from a pulley 38.

The pulley 38 may be directly driven by a motor M if desired, and the shaft 34, saw motor, etc. are all mounted on a swinging platform 40, in turn mounted on heavy durable shafts or hubs including bearings, etc. as indicated at 42. These hubs are mounted at the top end of a large upwardly extending projection or housing 44 which is an extension of portion 14.

The cylinder 16 is provided with a ram or the like at 46 which is pivotally connected as at 48 to the under side of the tilting platform 40; and by means of an adjustable connection 50, the stroke of the platform 40 may be adjusted. The saw will swing between the dotted line position in Fig. 1 to its downwardmost full line position wherein a slice or wafer has been cut from the workpiece 22 mounted on the plate 24.

The saw and the work mounting means are conveniently housed as in a casing 52 which may be provided with transparent slidable observation doors 54, 56 and 58, and appropriate hydraulic controls are provided for swinging the platform 40 at the desired speed and intervals in order to provide the proper rate of feed of the saw blade downwardly through the crystal or other workpiece. The platform 26 is a part of a cross-feed mechanism which is more particularly illustrated in Figs. 3 and 4, and is operated to be indexed for instance to the left in Fig. 2 between each downward stroke of the saw blade in order to advance the cross-feed saddle to be described, a sufficient amount for the next cut for each wafer. One wafer is completely severed at each stroke.

The cross-feed box is generally indicated by the reference numeral 60, and the numeral 62 indicates the square end of a feed shaft to which there may be applied a crank or the like, as indicated in dotted lines at 64 in Fig. 4, for manual operation of the feed screw in order to position the cross-feed box, to in turn position the work with relation to the saw blade. The saw blade always remains in the same plane, the crystal or other work being understood to move transversely to the plane of the saw, i.e., parallel to the axis of the saw shaft, in order to be indexed for each succeeding cut.

The feed shaft itself is indicated at 66 and as seen in Fig. 4, it is mounted in bearings 68, 70 and is provided with a one-way clutch device as at 72 for the purpose of eliminating any possible reverse motion or back-lash. Also, the cross-feed box has a portion indicated at 74 which contains mechanism to be described and also it mounts at its upper end as at 76 the plate 26 and work-holder 24 which are shown in Figs. 1 and 2.

This may be more clear by referring to Fig. 2 in which the housing 60 is shown as mounted on a saddle 80, this saddle being movable to the right and left upon a table 82 or the like having ways 84. It will be seen that the entire housing including platform 26 and work-support 24 are all mounted thereon and movable therewith.

In order to move this saddle and apparatus to feed the crystal for successive cuts, the shaft 66 is provided with a nut 90 (see Fig. 5) which is normally held in fixed relation on a portion 92 of the housing 12. This nut is held in its fixed relation by means of a swinging yoke 94 mounted on a pivot 96 and intermittently actuated by means of a hydraulic ram or the like 98 in the direction of the arrows in Fig. 5. This provides means for retracting the entire cross-feed mechanism between each stroke in order to relieve the work from the saw blade, so that upon the up stroke of the saw, there will be no interference between the saw and the work, and no possible damage can be done to the cut face of the crystal, etc. By the use of the diamond saw, a smooth cut is made and the wafers are ready for use as soon as they are cut off. That is, the severed wafers are immediately ready for division into small parts as required for transistors, etc.

After each cut, the hydraulic ram 98 is actuated in a direction to move the nut 90 to the right in Fig. 5 and thus move the feed screw 66 and the entire saddle to the right away from the saw blade as seen in Fig. 2, thus backing the work off from the blade in order to avoid any damage thereto during the upward stroke of the saw blade.

In order to rotate screw 66 to provide for the next cut, there is provided another hydraulic cylinder 100 which actuates a rack 102 in timed relation to the rest of the apparatus. This rack actuates a gear wheel 104 which has two positions of adjustment according to the circular notches 106 in a hand-operated actuator 108 which is connected thereto at 110 within housing 74. In the solid line position of gear 104 in Fig. 4, the rack is not in engagement with the gear, and does not actuate the same; but when the handle 112 is pulled to the left in Fig. 4, the gear 104 engages the teeth on the rack 102 and is operated thereby to in turn index a gear 114 at the stroke of the rack 102.

Gear 114 is provided with extra wide gear teeth at the periphery thereof so that the gear 104 is always in mesh with gear 114, and since the gear 114 is fixed to shaft 66, it causes the same to index at each actuation of the rack 102 as long as gear 104 is in mesh with said rack. When gear 104 is out of mesh with rack 102, the screw 66 may be actuated by hand by the crank handle 64.

The handle at 118 in Fig. 3 is for the purpose of adjustably positioning a stop pin 120 which engages the end 122 of the rack 102 and stops the same, thus accurately adjusting the degree of travel of the rack and thus the degree of rotation of shaft 66. By this means, the width of the slice being cut is very accurately adjusted as for instance from a few thousandths of an inch up to the maximum thickness required.

Another way of retracting the work at each stroke of the cutter is shown in Figs. 6 and 7. The saddle 80 in this case is directly connected by a fixture or bracket 124 to a cylinder 125 by an adjustable connection 126. A nut 128 is fixed against rotation in a housing 130 in turn fixed to table 92, and this nut is in mesh with the screw shaft 66. This construction will pull the saddle itself back a definite amount as the nut is provided with a slight axial motion in its housing 130, plus the small amount of any back-lash presence, when the cutter has reached the end of its stroke. Also, this cylinder will push the saddle forward the same amount when the automatic cross feed occurs at the completion of the up stroke of the cutter. Also by this construction, the saddle is held firmly in its forward working position during the cutting stroke, and cannot drift either way during the cut.

Thus it will be seen that the present machine provides a very accurate cutter for wafers and particularly for crystals of germanium. The machine is extremely strong, sturdy, and well balanced for the accurate cutting of the crystals at relatively high speeds and down to very small increments or thicknesses of crystal. The wafers are cut fast and production is high, and little or no attention to the machine is required except to remove the severed wafers and apply fresh crystals or other hard material workpieces to the work support 24.

Having thus described my invention and the advantages thereof, I do not wish to be limited to the details herein disclosed, otherwise than as set forth in the claims, but what I claim is:

1. A machine of the class described comprising a base, means for holding a workpiece in operative, fixed position, a saw mounted on the base for reciprocatory motion thereon, means for reciprocating said saw for cutting off thin wafers from the fixed workpiece at each reciprocation of the saw, intermittently operating means advancing said work-holding means in steps with relation to the plane of the saw blade and parallel to the axis of the said blade to saw the wafers successively, and means for backing the work-holding means and workpiece from the plane of the saw blade after completion of each saw cut while the saw blade retracts and prior to each step of advance the saw blade being retracted without contacting the cut face of the workpiece.

2. A machine for accurately severing thin wafers from hard materials comprising a standard, a table slidably mounted on said standard for reciprocation rectilinearly thereon, a saw blade, means mounting said saw blade for reciprocation in a plane at right angles to the direction of motion of the table, means rotating the saw blade, means mounting a workpiece from which the wafers are to be severed upon the table for reciprocation therewith, means indexing said table in steps to provide for successive cuts, reciprocatory hydraulic means retracting the entire table and workpiece mounting means in the opposite direction away from the saw blade upon the completion of each cut, the saw blade then being retracted without contacting the cut face of the workpiece, said table feeding means comprising a screw, a nut in mesh with the screw, a one-way clutch on the screw, and means to index said screw rotatably to provide for extremely small increments of advance of the table and workpiece prior to the return of the table to position for the next cut under influence of said hydraulic means.

3. A machine for accurately severing thin wafers from hard materials comprising a standard, a table slidably mounted on said standard for reciprocation rectilinearly thereon, a saw blade, means mounting said saw blade for reciprocation in a plane at right angles to the direction of motion of the table, means rotating the saw blade, means mounting the work from which the wafers are to be severed upon the table for reciprocation therewith, means indexing said table in steps to provide for successive cuts, means retracting the entire table, work mounting means and work in the opposite direction away from the saw blade upon the completion of each cut, the saw blade then being retracted without contacting the cut face of the work, said table feeding means comprising a screw, a nut in mesh with the screw, a one-way clutch on the screw, means to index said screw rotatably to provide for extremely small increments of advance of the table and work, oscillatory means mounting said nut, hydraulic means operating said oscillatory means, and holding said nut in position, and means actuating said hydraulic means in timed relationship with respect to the saw blade to move said screw and thereby said table retractably from said saw blade at the end of the feeding stroke of the latter.

4. A machine of the class described comprising a base, a saw mounted for reciprocatory motion thereon, means for reciprocating said saw, a table holding a workpiece in relation to said saw for cutting off thin wafers therefrom at each reciprocation, intermittently operating means advancing said table in steps with relation to the plane of the saw blade to saw the wafers successively, and means for backing the table and workpiece from the saw blade after completion of each cut and prior to each step of advance, the means for advancing the table comprising a screw-threaded shaft, means for indexing the same accurately providing for extremely thin wafers to be cut from said workpiece, said indexing means including a gear, a rack in mesh with said gear, and hydraulic means for operating said rack in one direction for turning said screw according to the length of travel of said rack.

5. The machine of claim 4 including a finely adjustable stop means for said rack for quickly and accurately adjusting the increments of rotation of the screw thereby to vary the thickness of the wafer being cut.

6. A machine of the class described comprising a base, ways thereon, a saddle mounted on said ways for rectilinear reciprocation thereon, means for traveling said saddle, said means including a threaded shaft operatively connected to the saddle, a nut for the shaft, means holding the nut against rotation, said nut having a limited axial motion, means for intermittently rotating the shaft to index the same so that the saddle is intermittently advanced in a predetermined direction, a swing-saw mounting a rotary saw blade, means to swing said swing-saw in a plane at right angles to the saddle, said means including a hydraulic cylinder, means to rotate the saw blade, means mounting a workpiece upon said saddle at one side of the saw blade, and means for retracting the entire saddle after each swing of the saw blade, said last-named means retracting the screw-threaded shaft and the nut with it in the opposite direction at the end of the cutting stroke of the saw blade, whereby the saw is retracted without touching or injuring the cut face of the workpiece mounted on the saddle, and said last-named means then advancing the saddle, shaft, and nut in timed relation to the next index of the shaft.

7. A machine according to claim 6 wherein the means for intermittently rotating said screw-threaded shaft comprises a spur gear thereon, a second spur gear in mesh therewith, and a rack in mesh with the second spur gear, a hydraulic cylinder for reciprocating said rack, and a one-way clutch on said screw-threaded shaft to provide for the return action of said rack.

8. A machine according to claim 6 wherein the means for intermittently rotating said screw-threaded shaft comprises a spur gear thereon, a second spur gear in mesh therewith, and a rack in mesh with the second spur gear, a hydraulic cylinder for reciprocating said rack, and a one-way clutch on said screw-threaded shaft to provide for the return action of said rack, an accurate stop for said rack, said stop being located at the end of the rack opposite said cylinder.

9. A machine according to claim 6 wherein the means for intermittently rotating said screw-threaded shaft comprises a spur gear thereon, a second spur gear in mesh therewith, and a rack in mesh with the second spur gear, a hydraulic cylinder for reciprocating said rack, and a one-way clutch on said screw-threaded shaft to provide for the return action of said rack, said second-named spur gear being mounted for selective manual adjustment in an axial direction, and always being in mesh with the first spur gear but capable of being in mesh or out of mesh with relation to said rack.

10. The machine of claim 6 wherein the saddle retracting means comprises a cylinder directly connected to the saddle and operative in timed relation to the stroke of the saw.

11. The machine of claim 6 wherein the saddle retracting means comprises a cylinder directly connected to the saddle and operative in timed relation to the stroke of the saw, the last-named cylinder being fixed relative to the base and being mounted on the means holding the nut against rotation.

12. The machine of claim 6 wherein the saddle retracting means comprises a cylinder directly connected to the saddle and operative in timed relation to the stroke of the saw, a housing for the nut fixing the same against rotation, the last-named cylinder being fixed relative to the base, and an adjustable connection between the last-named cylinder and the saddle.

13. A machine of the class described comprising a base, ways thereon, a saddle mounted on said ways for rectilinear reciprocation thereon, means for traveling said saddle, said means including a threaded shaft operatively connected to the saddle, means for intermittently rotating the shaft so that the saddle is intermittently advanced in a predetermined direction, a swing-saw mounting a rotary saw blade, means to swing said swing-saw in a plane at right angles to the saddle, said means including a hydraulic cylinder, means to rotate the saw blade, means mounting a crystal upon said saddle at one side of the saw blade, and means for retracting the entire saddle after each swing of the saw blade, said last-named means retracting the screw-threaded shaft in the opposite direction at the end of the cutting stroke of the saw blade, whereby the saw is retracted without touching or injuring the cut face of the crystal mounted on the saddle, said saddle retracting means including a nut for the screw-threaded shaft, a pivoted yoke, said nut being mounted on the yoke, and a hydraulic cylinder for intermittently operating the yoke to retract the nut, the screw-threaded shaft, and the saddle.

References Cited in the file of this patent

UNITED STATES PATENTS 2,718,098     Glendining _____ Sept. 20, 1955

FOREIGN PATENTS 628,508     Great Britain _____ Aug. 30, 1949